United States Patent
Tosh et al.

(10) Patent No.: US 9,230,459 B2
(45) Date of Patent: Jan. 5, 2016

(54) AMBIENCE REFLECTIVE DISPLAY FRAME

(71) Applicant: Dell Products L.P., Round Rock, TX (US)

(72) Inventors: Andrew P. Tosh, Cedar Park, TX (US); Deeder M. Aurongzeb, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 465 days.

(21) Appl. No.: 13/688,586

(22) Filed: Nov. 29, 2012

(65) Prior Publication Data

US 2014/0146520 A1     May 29, 2014

(51) Int. Cl.
   *H05K 7/18*         (2006.01)
   *G09F 13/04*      (2006.01)
   *G06F 1/16*       (2006.01)

(52) U.S. Cl.
   CPC .............. *G09F 13/04* (2013.01); *G06F 1/1607* (2013.01); *Y10T 29/4998* (2015.01)

(58) Field of Classification Search
CPC .......... G06F 1/1607; G09F 13/04; H05K 7/18
See application file for complete search history.

(56) References Cited

U.S. PATENT DOCUMENTS

| | | | |
|---|---|---|---|
| 4,232,341 A * | 11/1980 | Watanabe et al. | ............. 348/832 |
| 6,791,639 B2 | 9/2004 | Colgan et al. | |
| 2012/0224121 A1 | 9/2012 | Gilbert | |

FOREIGN PATENT DOCUMENTS

| | | |
|---|---|---|
| EP | 1149316 A1 | 10/2001 |
| EP | 2015134 A2 | 1/2009 |

* cited by examiner

*Primary Examiner* — Thomas M Sember
(74) *Attorney, Agent, or Firm* — Terrile, Cannatti, Chambers & Holland, LLP; Robert W. Holland

(57) ABSTRACT

An information handling system display frame disposed at the periphery of a display blends display and ambient light to provide a transitional zone for viewing of the display in ambient lighting conditions. A semi-scattering material absorbs light from the display and the ambient environment and scatters the light through the frame. A semi-reflective material directs at least some of the scattered light out of the frame so provide an appearance of the frame that transitions between displayed visual images of the display and the ambient light environment.

12 Claims, 2 Drawing Sheets

AMBIENCE REFLECTIVE DISPLAY FRAME

BACKGROUND OF THE INVENTION

1. Field of the Invention

The present invention relates in general to the field of information handling display devices, and more particularly to an information handling system ambience reflective display frame.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems process information for presentation at a display. In some instances, the display is in a housing separate from the information handling system, such as with fixed desktop type of information handling systems; in other instances, the display is integrated with the information handling system housing, such as with laptop and tablet information handling systems. Fixed displays typically present visual images in a fixed location having fixed ambient light conditions, such as an enterprise or home office. Portable information handling system displays often present visual images in a variety of ambient light conditions since end users often use portable information handling systems in a variety of locations. Generally, both portable and fixed displays have automated ambient light corrections that adjust display images based upon detected ambient light conditions. For instance, in dark interior rooms ambient light correction might dim displayed visual images while in bright outdoor conditions ambient light correction might brighten visual images. Typically, displays are framed with a dark bezel that defines the edge of the display screen.

End users tend to better interpret and retain displayed visual images where displayed objects and backgrounds are semantically consistent when compared with the same displayed objects presented with a semantically inconsistent background. Content creators control the presentation of displayed objects and associated backgrounds, however, content presentation can vary depending upon the type of information handling system, the type of display and the ambient lighting conditions. Content creators have to make assumptions regarding the environment in which content will be presented. In some instances, variance of ambient lighting conditions from anticipated ambient lighting conditions will have a negative impact on an end user's experience.

SUMMARY OF THE INVENTION

Therefore a need has arisen for a system and method which supports presentation of information at an information handling system display with a frame around the display that blends ambient lighting conditions and display presentation conditions.

In accordance with the present invention, a system and method are provided which substantially reduce the disadvantages and problems associated with previous methods and systems for presenting information at a display as visual images in varying ambient light conditions. A display frame proximate the periphery of a display blends display and ambient light to transition an end user's visual experience between visual images presented at a display and the ambient light environment.

More specifically, an information handling system processes information to generate visual information for presentation at a display, such as with an application executing on a CPU that presents pictures or a movie. A display frame disposed at the periphery of the display captures light emitted from the display and ambient light in a semi-scattering material to blend the display and ambient light for retransmission so that the display frame presents a transition zone between displayed visual images and ambient conditions. A semi-reflective material provides reflection of the light outwards from the display frame. In one example embodiment, the semi-scattering material is a polymer having embedded scattering particles, such as a styrene-stat-acrylonitrile (SAN) and poly[(SAN)-graft-polybutadiene] (g-ABS) compound having titanium oxide or alumina micro particles of less than 10 micrometers at 10% by weight. In some cases the polymer can be injection molded with semi-reflecting prismatic mirror particles, such as glass nanoparticle coated with aluminum thinfilm and having a size in the order of <300 nm. The semi-reflective material is a thin metallic coating one a lower portion of the scattering material, such as sputter coated aluminum at a thickness of 50 nm that provides weak reflectivity of light. In one alternative embodiment, the intensity and color of display light provided to the display frame is actively managed by a frame controller associated with a display controller that controls backlight provided to the display.

The present invention provides a number of important technical advantages. One example of an important technical advantage is that ambient lighting conditions and display lighting conditions blend at the display frame that supports the display to provide a visually symmetrical end user experience. Blending of display and ambient light at the display frame disposed around the display periphery naturally adjusts the symmetrical appearance of the display to adapt to changes in display and ambient conditions. A gradual transition from visual images presented at a display through a display frame surrounding the display periphery and into the ambient lighting environment reduces end user disruption that can occur if to contrasts between a displayed visual image and the surrounding environment are extreme. In one embodiment, adding active control to display frame blending, such as by selectively bleeding varying amounts and colors of display backlight into the frame, provides another tool for content creators to use in managing an end user's experience during consumption of content.

BRIEF DESCRIPTION OF THE DRAWINGS

The present invention may be better understood, and its numerous objects, features and advantages made apparent to FIG. 1 depicts an information handling system interfaced with a display having an ambience reflective display frame.

DETAILED DESCRIPTION

An ambience reflective display frame provides a transition between an ambient environment and images presented at a display, such as images generated by an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
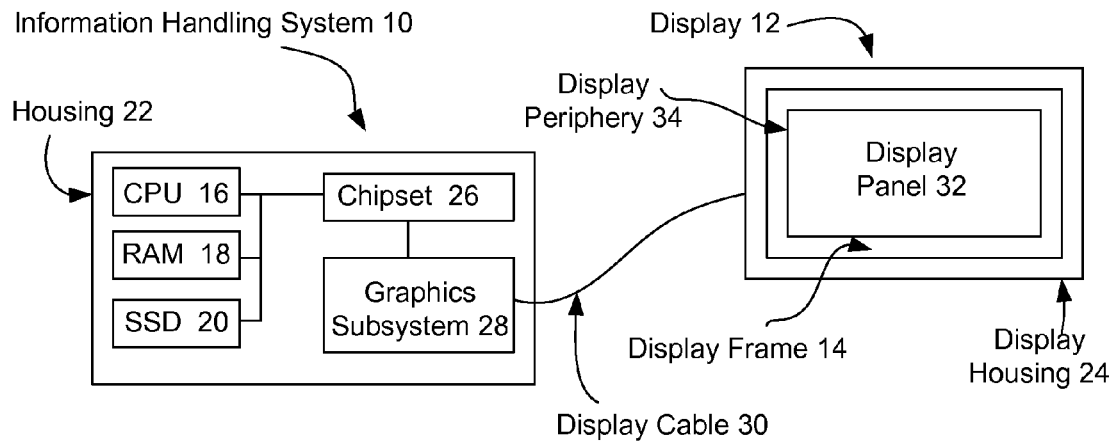

Referring now to FIG. 1, an information handling system 10 is depicted interfaced with a display 12 having an ambience reflective display frame 14. Information handling system 10 processes information with CPU 16 that executes instructions stored in memory, such as RAM 18 or solid state drive 20. In the example embodiment depicted by FIG. 1, information handling system 10 is built in a housing 22 separate from a display housing 24 that contains display 12. Information processed by CPU 16 is managed by firmware of a chipset 26 for rendering into visual information by a graphics system 28. For example, a viewing application stored in solid state drive 20 is executed on CPU 16 to decompress pictures stored in RAM 18, which graphic system 28 further processes to create pixel values for communication to display 12 through a display cable 30, such as Displayport cable. In alternative embodiments, alternative display functionality may be used to present visual images at display 12 as the particular mechanism for generating a visual images is not meant to limit this disclosure.

Display housing 24 supports a display panel 32 that generates visual images with plural pixels, such as a liquid crystal display (LCD) panel. Display panel 32 has a periphery 34 defined by the outer range of pixels that present visual images. Display frame 14 is disposed proximate periphery 34 of display panel 32, meaning adjacent to, slightly distant from or slightly overlapping the pixels at periphery 34. Display frame 14 can rest above display panel 32 or embed slightly into display housing 24 below display panel 32. Display frame 14 interacts with light emitted by display panel 32 and ambient light of the environment around display 12 to create a transition of blended display and ambient light presented at periphery 34 around display panel 32. Blended display and ambient light emitted by display frame 12 creates a symmetrical viewing experience for an end user. For instance, a relatively bright display image in a dark ambient environment might have a display frame 14 with a slightly less bright presentation proximate periphery 34 that grows less bright as the distance from periphery 34 increases. Alternatively, a relatively dark display image in a bright ambient might have a display frame 14 that transitions from a presentation at periphery 34 that is slightly brighter than the display image to a greater brightness of display frame 14 outward away from periphery 34. In an alternative embodiment, display frame 14 might have a relatively consistent brightness across its width. In alternative embodiments, the width of display frame 14 can extend from periphery 34 partially or completely to the outer periphery of display housing 24.

Figure 2:
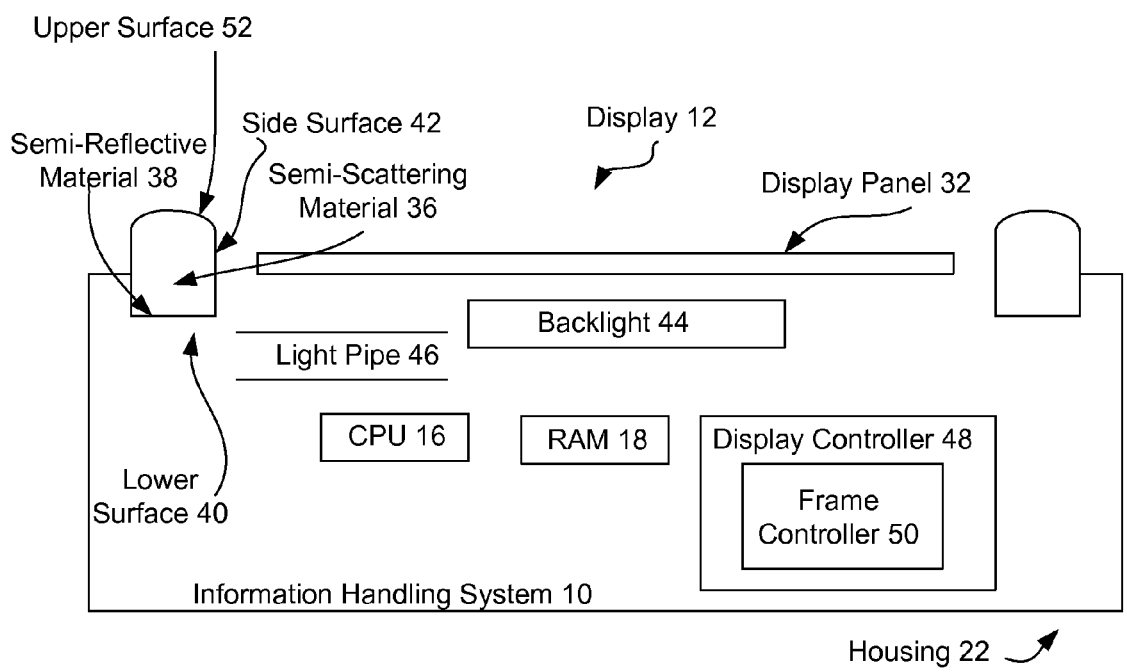
FIG. 2 depicts a side cutaway view of a tablet information handling system having an integrated display and an ambience reflective display frame.

Referring now to FIG. 2, a side cutaway view depicts a tablet information handling system 10 having an integrated display 12 and an ambience reflective display frame 14. Tablet information handling system 10 has a planar housing 22 that supports CPU 16, RAM 18, graphics subsystem 28, display panel 32 and other processing components that cooperate to generate and present visual images. Display frame 14 has a semi-scattering material 36 to scatter light absorbed from display 12 and the ambient environment, and a semi-reflective material 38 disposed on a lower surface 40 to partially reflect light outwards from display frame 14. A number of different materials may be used as semi-scattering material 36 and semi-reflective material 38 in a number of different layouts as set forth herein below. In the example embodiment depicted by FIG. 2, a side surface 42 of display frame 14 extends slightly below display panel 32 to allow semi-scattering material 36 to absorb light emitted through display panel 32 and light from a backlight 44 disposed below display panel 32. In the example embodiment, backlight 44 has one or more light pipes 46 to direct light towards side surface 42. Illumination of backlight 44 is managed by a display controller 48 to control the brightness of images presented at display panel 32. A frame controller 50 manages application of backlight 44 through light pipe 46 for active control over the brightness of illumination of frame 14. In one embodiment, light pipe 46 may provide various levels of red, green and blue light from red, green and blue LEDs of backlight 44 to provide some active control of the color of illumination at frame 14, thus providing content creators with an additional tool for presenting visual images with various levels of symmetry provided by frame 14.

Although FIG. 2 depicts side surface 42 as substantially perpendicular to display panel 32, in alternative embodiments various angles and shapes may be used to form a display frame 14 with varying optical qualities. For instance, side surface 42 might angle towards or away from a substantially perpendicular alignment with display panel 32 in order to introduce optical effects not present with a substantially perpendicular alignment. Similarly, lower surface 46 is depicted substantially parallel with display panel 32, however, in alternative embodiments lower surface 46 might angle towards or away from a substantially parallel alignment in order to introduce optical effects. As an additional example, an upper surface 52 of display frame 14 is depicted as having a semicircular shape that extends upwards, however, in alternative embodiments one or more inclined upper surfaces may provide varying optical effects, as depicted by FIG. 3.

Figure 3:
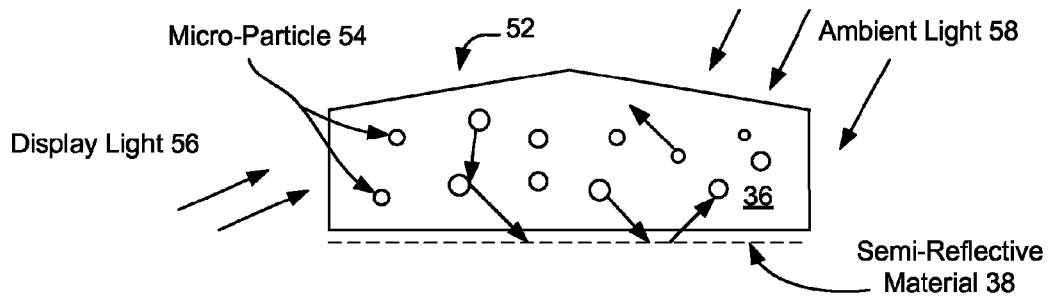
FIG. 3 depicts a side cutaway view of an ambience reflective display frame with exemplary light paths.

Referring now to FIG. 3, a side cutaway view depicts an ambience reflective display frame 14 with exemplary light paths. In the example embodiment, display frame 14 has an upper surface 52 with two inclined surfaces having a slight angle off from a parallel alignment with a display panel 32. Semi-scattering material 36 has embedded micro-particles 54 that re-direct light entering into and leaving from frame 14. Display light indicated by arrows 56 enters frame 14 proximate a display panel 32 to interact with micro-particles 54 and semi-reflective material 38. Similarly, ambient light indicated by arrows 58 enters frame 14 at regions of frame 14 that are exposed to the ambient environment for re-direction by micro-particles 54 and semi-reflective material 38. Display and ambient light are effectively blended to provide a transition between illumination provided by the display and ambient illumination. The degree of blending and transition across frame 14 is adjusted by the type, amount and disposition of semi-scattering material 36 and semi-reflective material 38 of frame 14.

In the example embodiment depicted by FIG. 3, semi-scattering material 38 is a polymer that provides at least some transmission of light and has a slight tilt in upper surface 52 introduced by two inclined planes. For instance, a terpolymer available for embedding micro-particles 54 is acrylonitrile-butadiene-styrene (ABS). In one example embodiment, styrene-stat-acrylonitrile (SAN) and poly[(styrene-stat-acrylonitrile)-graft-polybutadiene] (g-ABS) are dry blended with a 3:2 weight ratio and then micro-particles of titanium oxide and/or alumina of less than 10 micrometers sol gel is added at 10% by weight. After preparation of a frame shape as set forth herein by FIG. 4, a lower surface 40 is sputter coated with 50 nm of aluminum to provide weak reflectivity for a semi-reflective material. In alternative embodiments, alternative materials may provide the semi-scattering and semi-reflective properties. For example, other types of semi-transparent oxide particles may be used instead of or with titanium oxide or alumina. As another example, transparent $Y_2O_3$—$Al_2O_3$—$SiO_2$ glasses show a maximum transmittance of greater than 50% in region with 20% reflective performance that offers a single material having both semi-scattering and semi-reflective properties. In such an embodiment, the quality of prepared glasses strongly depends upon the preheating temperature, the excess of aluminum and the content of $SiO_2$ in starting compositions. In cases where some coloration, such as a blue hue is needed, cobolt oxide nanoparticles or iron oxide nanoparticles can be used separately or in combination in the glass. The blue or a yellow hue can be desirable for bluish sunlight with color temperature 4000K-7000K or indoor lighting ranging from 3000-4000K.

In alternative embodiments, alternative materials can provide blending of display and ambient light. An example goal for a display frame material provides some light reflection, such as greater than 40%, to mirror the surrounding light conditions and some diffusion for mixing light over a transition zone. For instance, an aluminum or plastic frame can be laminated with alumina or transparent $Y_2O_3$—$Al_2O_3$—$SiO_2$ glasses or similar glasses to provide mixed scattering. As an upper layer, diffusion bond corning flexible glass provides a similar effect. Lamination of a variety of layers of material provide tailored choices for light guiding and reflection of various aspects from surrounding light conditions. For example, ABS or thermoplastics that are semi-transparent can be molded with micro lens, which direct light in certain directions for forming a diffused image, such as micro lens particles available from 3M Corporation. A laminated glass frame with various layers can be tailored to make the frame optically multi-functional. As an exemplar embodiment, a unidirectional glass fiber band and bundle provides diffused reflection with graphene and/or graphene oxide doped with ZnO:Ga or ZnO:Al for infrared and visible reflectivity. As another alternative, various coatings over quartz class or aluminum frames provide a diffused reflection effect. For example, nanoporous poly(methylsilsesquioxane) (PMSSQ) films prepared with a sacrificial-porogen (pore generator) approach provide an antireflection coating with a relatively simple film preparation that has a tunable refractive index and excellent thickness control. Such films provided over a quartz base glass frame or polycarbonate frame will provide a diffused reflection effect. An IR or near-IR coating of ZnO can be applied using vacuum deposition for protecting a display from heat-related light.

Figure 4:
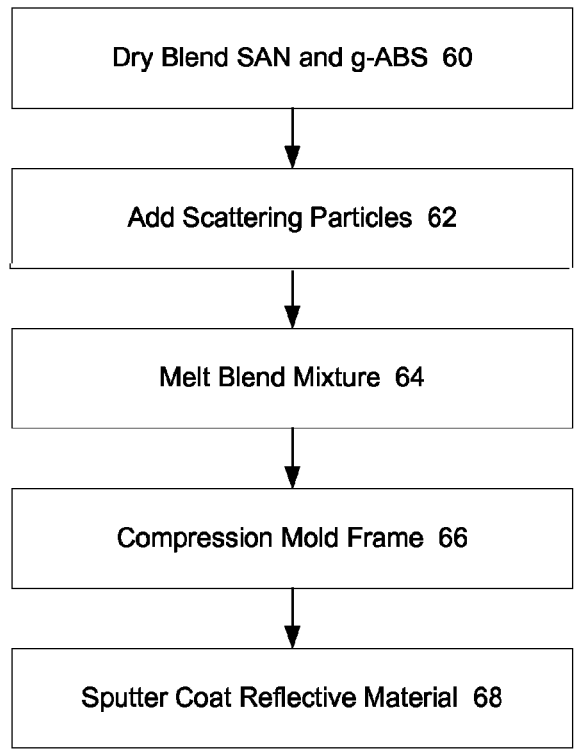
FIG. 4 depicts a flow diagram of a process for manufacture of an ambience reflective display frame.

Referring now to FIG. 4, a flow diagram depicts a process for manufacture of an ambience reflective display frame. At step 60 SAN and g-ABS are dry blended with a 3:2 weight ratio. At step 62 scattering particles are added to the SAN and g-ABS mixture, such as titanium oxide or alumina micro-particles of less than 10 micrometers and sol gel at 10% by weight respectively. At step 64, the sample is melt-blended with an extrusion process in a ZSK25 twin-screw co-rotating compounder having a screw speed of 550 RPM and feeding rate of 8 kg/h and with heating zone temperatures fixed at approximately 200 degrees Celsius. After compounding, the process continues to step 66 where the sample is compression molded into a display frame shape at 25 MPa and 205 degrees Celsius to a sheet thickness of 1 mm. At step 68, one side of the sheet is sputter coated with 50 nm of aluminum to provide weak reflectivity of light. FIG. 4 provides one embodiment of a process for manufacture of a display frame, however, in alternative embodiments alternative manufacturing techniques may be employed to achieve desired light scattering and reflection of the display frame. Some commercial products, such as polycarbonate based clear plastic, Lexan, can also be used as a display frame where the surface can be molded with prismatic type structures. For loading strength, graphene oxide, carbon nanofiber or alumina nanofiber can also be used to produce scattering and strength in the polycarbonate. Note that, carbon nanofiber or nanotubes loading can produce an additional strength advantage. In some cases where the display frame is glass, facets can be milled in the surface to guide lights toward the display, thus providing additional illumination to the display using the bezel. Silica or metal oxide based nanofiber of tubes are now commercially available for light guiding purposes, where they can be directionally loaded in the display frame and melted in with polymer and plastic to direct light toward desired location or uniform scattering and distribution, such as orthogonal to the display plane.

Although the present invention has been described in detail, it should be understood that various changes, substitutions and alterations can be made hereto without departing from the spirit and scope of the invention as defined by the appended claims.

What is claimed is:

1. A method for manufacture of a display frame, the method comprising:
   blending a polymer and scattering particles;
   compression molding the blended polymer and scattering particles to form a frame shape having a semi-scattering material, the frame shape having an upper surface and lower surface, the upper surface exposed at the display, the lower surface coupled to the display;
   sputter coating a portion of the frame shape to form a semi-reflective surface on the lower surface; and assembling the frame shape at the periphery of a display aligned to absorb display light and ambient light through the semi-scattering material towards the semi-reflective surface.

2. The method of claim 1 wherein blending a polymer and scattering particles further comprises blending ABS and $TiO_2$.

3. The method of claim 1 wherein blending a polymer and scattering particles further comprises blending ABS and $Al_2O_3$.

4. The method of claim 1 wherein sputter coating a portion of the frame further comprises sputter coating one side of the frame shape with substantially 50 nm of aluminum.

5. The method claim 4 wherein the frame shape has a thickness of substantially 1 mm.

6. The method of claim 1 wherein assembling the frame shape at the periphery of the display further comprises aligning at least a portion of the frame shape to have exposure to backlight beneath the display.

7. The method of claim 1 wherein compression molding the blended polymer and scattering particles to form a frame shape further comprises forming an upper surface of the frame shape to have an incline relative to the display.

8. A method for manufacture of a display frame, the method comprising:
   blending a glass and scattering particles;
   compression molding the glass and scattering particles to form a frame shape having an upper exposed surface and a lower surface that couples to a display;
   sputter coating a portion of the frame shape to form a semi-reflective surface on the lower surface; and
   disposing the frame shape at a periphery of a display aligned to guide display light and ambient light through the scattering particles towards the semi-reflective surface at the lower surface.

9. The method of claim 8 wherein blending further comprises blending glass nanofiber loading of at least 10% with the glass and scattering particles.

10. The method of claim 9 wherein the glass nanofiber have an orientation directional and orthogonal to the display plane.

11. The method of claim 8 wherein the scattering particles comprise prismatic material.

12. The method of claim 8 wherein blending further comprises adding cobalt oxide particles to the glass and scattering particles to add a blue hue.

* * * * *